(12) United States Patent
Dougherty

(10) Patent No.: US 6,405,104 B1
(45) Date of Patent: Jun. 11, 2002

(54) FAULT DATA SYNCHRONIZATION VIA PEER-TO-PEER COMMUNICATIONS NETWORK

(75) Inventor: John James Dougherty, Collegeville, PA (US)

(73) Assignee: General Electric Corporation, Schenectady, NY (US)

(*) Notice: Subject to any disclaimer, the term of this patent is extended or adjusted under 35 U.S.C. 154(b) by 0 days.

(21) Appl. No.: 09/275,347

(22) Filed: Mar. 24, 1999

(51) Int. Cl.[7] .................. G06F 19/00; G05B 19/18; G05B 9/02; G01R 21/00
(52) U.S. Cl. ............... 700/292; 700/4; 700/79; 702/62
(58) Field of Search .............. 700/2, 4, 79, 286, 700/292, 293, 297; 702/57, 60, 62; 714/4; 340/500

(56) References Cited

U.S. PATENT DOCUMENTS

| | | | | |
|---|---|---|---|---|
| 4,994,934 A | * | 2/1991 | Bouhenguel | 361/71 |
| 5,185,705 A | * | 2/1993 | Farrington | 364/483 |
| 5,224,054 A | | 6/1993 | Wallis | 364/483 |
| 5,233,538 A | | 8/1993 | Wallis | 364/483 |
| 5,315,499 A | * | 5/1994 | Bilas et al. | 364/140 |
| 5,680,324 A | * | 10/1997 | Schweitzer, III et al. | 364/514 |
| 5,982,595 A | * | 11/1999 | Pozzuoli | 361/62 |
| 6,006,338 A | * | 12/1999 | Longsdorf et al. | 713/340 |
| 6,205,362 B1 | * | 3/2001 | Eidson | 700/4 |
| 6,246,928 B1 | * | 6/2001 | Louis et al. | 700/292 |
| 6,256,592 B1 | * | 7/2001 | Roberts et al. | 324/512 |
| 6,269,316 B1 | * | 7/2001 | Hubbard et al. | 702/61 |
| 6,313,752 B1 | * | 11/2001 | Corrigan et al. | 324/76.13 |

OTHER PUBLICATIONS

PCT/US/00/6426 International Search Report.
XP 000923430, Stuart H. Borlase, "Advancing to True Station and Distribution System Integration in Electric Utilities", Jan. 1998, vol. 13 No. 1, pp. 129–134.
XP 000923431, Alexander Apostolov et al., "Network Interface Modules for Microprocessor Relays Integration Into A Substation Automation System", 1997, pp. 309–312.

* cited by examiner

*Primary Examiner*—Leo P. Picard
*Assistant Examiner*—Elliot Frank
(74) *Attorney, Agent, or Firm*—Karl Vick; Kevin T. Duncan; Hunton & Williams

(57) ABSTRACT

A system and method for synchronizing power system data gathered in response to unscheduled power system events such as faults. A plurality of protective devices communicate over a peer-to-peer communication network, and when a first device detects the occurrence of a power system event, the device records cycles of power system data before, after, or surrounding the power system event. The first device informs remote devices via the network of the event and a time tag associated with the event, and the remote devices record synchronized power system data.

21 Claims, 1 Drawing Sheet

FAULT DATA SYNCHRONIZATION VIA PEER-TO-PEER COMMUNICATIONS NETWORK

BACKGROUND OF THE INVENTION

The present invention generally relates to relays that provide protective control of power distribution systems. More particularly, the present invention relates to a technique for synchronizing the gathering of fault data from multiple protective relays.

Power system faults can start and finish rapidly. Protective relays are designed to sense faults and provide protective control by operating a circuit breaker to interrupt the fault. A modem protective relay incorporates digital signal processing to analyze fault data by capturing sampled waveforms before and after the protective relay interrupts the power system. To fully analyze the cause and extent of a fault, analysis of fault data at multiple locations on the power system is necessary.

Conventional systems for monitoring protective relay fault data are primarily master-slave communication systems in which a central control station (master) initiates communications to the protective relays (slaves). In master-slave systems, the master initiates all communications. In a common approach, the master control station cyclically and sequentially monitors each slave device for a change of state. This monitoring process introduces significant delays between the time that the relay reacts to a fault and the control station learns of the fault. The control station can signal other relays to record a waveform, but the ensuing delay is unacceptable in master-slave systems for capturing information at the time of the fault across the system.

U.S. Pat. Nos. 5,224,054 and 5,233,538 to Wallis disclose the capturing of synchronized sampled data in master-slave systems. These patents disclose a technique which employs a control station which sends a command signal to multiple "circuit monitors" to synchronously sample the system at the present or a future time. While this approach is adequate for characterizing a power system on demand or at a scheduled time, this approach does not adequately address the synchronization of fault data because faults do not occur according to a schedule.

Current advanced trip units and protective relays capture waveforms at the time of the fault. In a typical arrangement, a protective relay will continuously measure and discard up to 72 cycles of power system data. When the (unexpected) fault occurs, the protective relay continues to sample the waveform (and other calculated parameters and status flags) for a preset number of cycles. After this period, the full number of stored samples, comprising cycles of power system information before and after the fault are place in storage for future communication to a local or remote computer. While this process effectively provides fault data information, it does so at only one point in the system.

SUMMARY OF THE INVENTION

In view of the above discussion, it would be desirable to provide a method for synchronously recording sampled power system data at multiple points in the power system when a power system event occurs. It would further be desirable for such data to be post-processed to synchronize the information from multiple sources.

In accordance with the exemplary embodiments described below, the present invention can be implemented by sensing a power system event, such as a fault, in a first protective relay associated with a first point on the power system; recording a time tag of the power system event and a first set of power system data; and transmitting a data message from the first protective relay to remote protective relays over a peer-to-peer communications network. The first protective relays and remote protective relays are preferably synchronized (e.g., by a common time standard), The data message preferably includes the time tag of the power system event. Each remote relay can then use the time tag to save its own set of power system data which is synchronized to the first set of power system data.

The technique of the present invention advantageously provides system-wide data surrounding a fault, power surge, or other power system event. This information permits a user to analyze more accurately the cause and effects of the power system event.

BRIEF DESCRIPTION OF THE DRAWINGS

The features and advantages of the present invention can be understood more clearly by reading the following Detailed Description, in conjunction with the accompanying drawings, in which.

DETAILED DESCRIPTION

Figure 1:
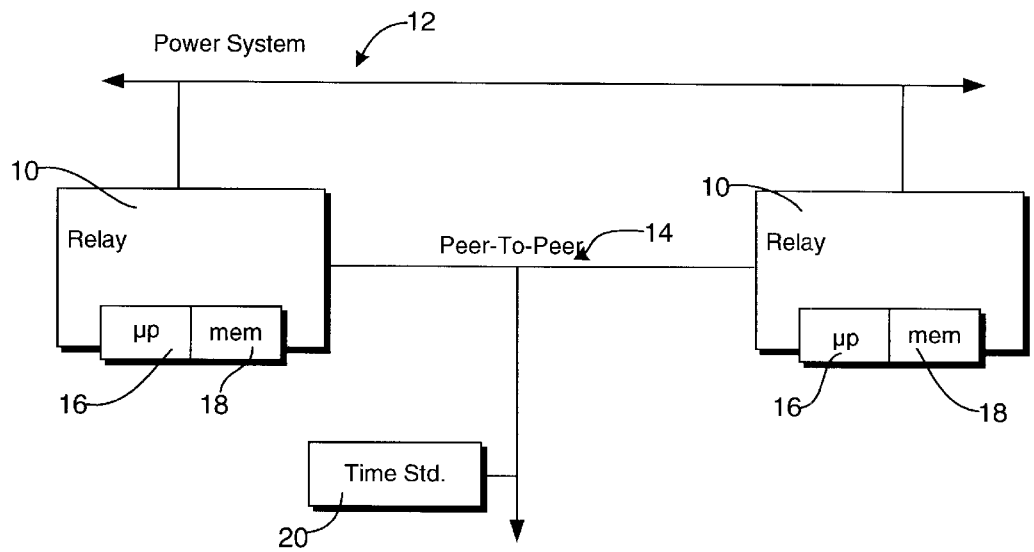
FIG. 1 is a block diagram of a power system under the protective control of a power protection scheme according to one embodiment of the present invention.

Referring now to FIG. 1, a power system under the protective control of a protection scheme according to one embodiment of the present invention is shown. In FIG. 1, a plurality of protective relays 10 is operatively connected to provide protective control to a power system 12. The protective relays 10 are further operatively connected, via appropriate communications ports, to a peer-to-peer communications network 14. The protective relays 10 each include a microprocessor 16, an associated memory 18, and a time clock (not shown). The time clocks of the relays 10 are synchronized by a time standard 20, which can be operatively connected to the peer-to-peer communications network 14, or can be operatively connected to each of the relays by other appropriate means. Each protective relay 10 samples power system data at an associated point on the power system, and temporarily holds (e.g., in a buffer associated with the microprocessor 16) some number of cycles of power system data. The temporarily stored (sampled and held) cycles of power system data are replaced by new cycles of power system data as the relay 10 continues to sample and hold new power system data.

In operation, the system of FIG. 1 achieves synchronized sampled data capture at multiple locations in the power system for unplanned events, such as faults. The peer-to-peer communications network 14, as contrasted with a conventional master/slave communications network, uses a protocol which allows each device on the communications network 14 to initiate communications if the network is available (that is, if the communications bus is not already in use). In a conventional master/slave system, only the master can initiate communications, and when a slave device senses a condition in the system, the slave cannot communicate this fact until the master requests information from (polls) the slave device. Examples of peer-to-peer communications systems include a so-called Field Messaging System under the Profibus or Ethernet protocol.

Time synchronization is practiced in conventional protective relay systems. Protective relays are conventionally provided with an internal real time clock which continuously keeps time within the relay. Each event within the relay can be time tagged to this internal clock. Time synchronization can be achieved by connecting each device to a time standard, such as the IRIG-B time standard, which not only synchronizes all the devices to each other, but also to universal coordinated time. The time standard includes a radio receiver, which allows the standard to receive accurate time updates from one of a number of international time standard transmitters. Thus, a connection to a time standard 20 can provide an exact time pulse to the protective relay and a digital time command by which the protective relay can update its internal time clock.

Figure 2:
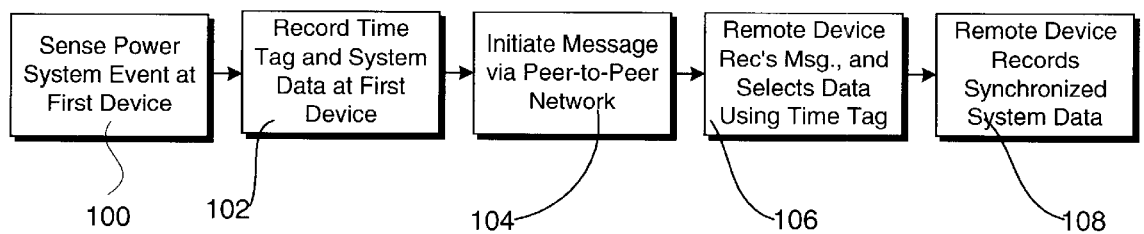
FIG. 2 is a flow chart describing a method according to an exemplary embodiment of the present invention.

Referring now to FIG. 2, a flow chart describing a method according to one embodiment of the present invention is shown. The method of FIG. 2 begins in step 100, where a first protective relay 10 (FIG. 1) associated with a first point on the power system senses a power system event, such as a fault. In step 102, the first protective relay records a time tag of the power system event, and the processor associated with the relay saves a first set of power system data (e.g., 72 cycles) relating to the detected event. The first set of power system data preferably includes data cycles leading up to the power system event, as well as some power system data cycles following the event. Step 102 can be performed by the processor collecting storing the first set of power system data in memory 18, or in other suitable data storage means for storing data more permanently than the relay's data sampling system. For example, the microprocessor 16 can select 72 cycles of buffered data, which might include a distribution of 60 cycles of power system data before a fault and 12 cycles of power system data following the fault. In step 104, the first protective relay initiates the transmission of a data to other protective relays over a peer-to-peer communications network, indicating that a power system event has occurred. The data message preferably includes the time tag of the event, and can also include an indication of the number and/or distribution of cycles of power system data recorded by the first protective relay. Alternatively, each relay can be programmed (via its associated microprocessor) to record a predetermined number and distribution of cycles of power system data surrounding a power system event. In step 106, the other devices associated with the peer-to-peer network receive the data message, and each receiving device uses the received time tag to determine which cycles of power system data should be saved in its associated memory. In step 108, each relay records one or more cycles of power system data corresponding to the first set based on the time difference determined in step 106, along with the time tag of the event. Preferably, each protective relay sets its sampled data system, under the control of the microprocessor associated with the relay, to save exact same number and distribution of data cycles relating to the power system event, indicated by the time tag, as the first protective relay (the device originating the communication message).

In the manner of the above example, the technique of the present invention results in synchronized power system data for unexpected events, and the synchronized data can be readily retrieved at a later time for analysis (e.g., in an analysis program) of the causes and effects of the power system event. The synchronized data can show the data sampled by different protective relays at the same time just prior to, or just following, a power system event.

The present invention achieves numerous advantages over known systems, especially those that employ master/slave communication systems. Because in master/slave communication systems, a master polls slave devices to determine the occurrence of a fault, the master may not be aware of the fault until it is too late (e.g., because the slave device's sample and hold system has already discarded relevant data) to instruct the slave devices to save desired data.

While the foregoing description includes numerous details and specificities, these are provided for purposes of explanation only, and are not to be construed as limitations of the present invention. Many modifications to the above examples will be readily apparent to those of ordinary skill in the art which are within the spirit and scope of the invention, as defined by the following claims and their legal equivalents.

What is claimed is:

1. A method of providing synchronized fault data in a power system, comprising the steps of:

Sensing, in a first protective relay associated with a first point on the power system, a power system event;

Recording, in the first protective relay, a time tag of the power system event and a first set of one or more cycles of power system data relating to the event;

Initiating the communication of a data message to other protective relays over a peer-to-peer communications network, the data message including the time tag;

Determining, in each of the other protective relays, a set of power system data corresponding to the first set, based on the time tag in the data message; and Recording, in each of the other protective relays, a determined corresponding set.

2. The method of claim 1, further comprising the step of storing, in a memory associated with each of the other protective relays, synchronized data including one or more cycles of power system data and the time tag.

3. The method of claim 2, further comprising the step of retrieving the stored synchronized data from the memories for fault analysis.

4. The method of claim 1, wherein each determined corresponding set includes the same number of power cycles as the first set.

5. The method of claim 1, wherein each protective relay is connected to a common time standard.

6. The method of claim 5, wherein the time standard is IRIG-B.

7. The method of claim 1, wherein the message is communicated according to a Profibus protocol.

8. The method of claim 1, wherein the message is communicated according to an Ethernet protcol.

9. The method of claim 1, wherein the first set, and each determined corresponding set include a predetermined number of cycles of power system data.

10. A system for providing protective control of a power distribution system, comprising:

a plurality of digital protective relays, each relay being operatively connected to a point in the power distribution system so as to provide protective control, each relay having a digital processor and a memory for storing cycles of power system data;

a peer-to-peer communications network connected to exchange data messages-between the plurality of protective relays; and a time standard operatively connected to each of the plurality of protective relays such that the plurality of protective relays is synchronized, wherein each of the plurality of protective relays synchronously records and stores cycles of power system data in response to a detection of a fault by one or more of the plurality of protective relays.

11. The system of claim 10, wherein each of the plurality of protective relays stores the same number of cycles of power system data in response to the detection of the fault.

12. The system of claim 10, wherein a detecting one of the plurality of protective relays transmits a message over the peer-to-peer communications network to inform other protective relays of the occurrence of the fault.

13. The system of claim 12, wherein the message includes a time tag indicative of a time associated with the fault.

14. The system of claim 10, wherein the message is communicated according to a Profibus protocol.

15. The system of claim 10, wherein the message is communicated according to an Ethernet protocol.

16. The system of claim 13, wherein the other protective relays determine which cycles of power system data to save based on the time tag in the message.

17. A protective relay, comprising:

a microprocessor arranged to receive and monitor power system data, to initiate communication over a peer-to-peer communications network to inform other protective relays of the occurrence of a power system event, and to receive communications from other protective relays indicating the occurrence of a power system event, each communication including a time tag of the power system event;

a memory associated with the microprocessor, the memory storing a first set of cycles of power system data in response to the occurrence of a power system event; and an internal clock synchronized to internal clocks of other protective relays associated with the peer-to-peer communications network.

18. The protective relay of claim 17, wherein the microprocessor, upon receiving a communication from other protective relays indicating the occurrence of a power system event, determines which cycles of power system data to store based on the time tag.

19. The protective relay of claim 17, wherein the communications are according to a Profibus protocol.

20. The protective relay of claim 17, wherein the communications are according to an Ethernet protocol.

21. The protective relay of claim 17, wherein the number of cycles of power system data is a predetermined number.

* * * * *